(12) United States Patent
Armstrong et al.

(10) Patent No.: US 6,913,556 B2
(45) Date of Patent: Jul. 5, 2005

(54) POWER TRANSMISSION FOR A VEHICLE

(75) Inventors: Paula J. Armstrong, Canton, MI (US); Scott H. Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/693,684

(22) Filed: Oct. 24, 2003

(65) Prior Publication Data

US 2005/0090361 A1 Apr. 28, 2005

(51) Int. Cl.⁷ .............................................. F16H 3/44
(52) U.S. Cl. ...................... 475/269; 475/275; 475/276; 475/277; 475/278; 475/281; 475/284; 475/285
(58) Field of Search ................................ 475/269, 275, 475/276, 277, 278, 281, 284, 285

(56) References Cited

U.S. PATENT DOCUMENTS 3,811,343 A * 5/1974 Mori et al. .................. 475/285
5,106,352 A 4/1992 Lepelletier .................. 475/280
6,071,208 A * 6/2000 Koivunen .................... 475/275
6,135,912 A 10/2000 Tsukamoto et al. ......... 475/271
6,572,507 B1 6/2003 Korkmaz et al. ........... 475/276

FOREIGN PATENT DOCUMENTS

JP 02118247 A * 5/1990 ............. F16H 3/66

* cited by examiner

*Primary Examiner*—Saul Rodriguez
*Assistant Examiner*—David D. Le
(74) *Attorney, Agent, or Firm*—Leslie C. Hodges (57) ABSTRACT

A compact longitudinal transmission has an input shaft rotatably supported in a front end wall, an output shaft rotatably supported in a rear end wall, and a housing interconnecting the front end wall and the rear end wall. Three planetary gearsets disposed within the housing are controlled by five torque-transmitting mechanisms including four friction disc or plate mechanisms and one band mechanism. The band mechanism being disposed radially outboard of the rearmost one of the planetary gearsets.

1 Claim, 6 Drawing Sheets

POWER TRANSMISSION FOR A VEHICLE

TECHNICAL FIELD

This invention relates to power transmissions for vehicles and, more particularly, to a multi-speed power transmission providing a plurality of forward speed ratios and a reverse speed ratio through the selective manipulation of a plurality of friction torque-transmitting mechanisms.

BACKGROUND OF THE INVENTION

Automatic power transmissions are currently used in a number of passenger vehicles sold within this country. As is well known, the automatic transmission provides a plurality of planetary speed ratios in both the forward direction and at least one reverse speed ratio. These speed ratios are established through the use of a plurality of planetary gearsets, which are controlled by a number of fluid-operated friction torque-transmitting mechanisms, commonly termed clutches and brakes.

It has become a standard to provide at least four forward speed ratios in automatic transmissions for use in passenger vehicles. More recently, automobile manufacturers have increased the forward speed ratios to five and in some instances six. This, of course, requires the addition of planetary gearsets as well as trying to maintain the number of torque-transmitting mechanisms at a minimum.

A number of the currently proposed six speed planetary transmissions provide three planetary gearsets and five friction torque-transmitting mechanisms. This gives rise to a packaging situation for the positioning of the torque-transmitting mechanisms within the transmission environment.

One such transmission is described in U.S. Pat. No. 5,106,352 issued to Lepelletier Apr. 21, 1992. This power transmission provides six forward speed ratios and employs an input gearset and a ratio gearset. The input gearset of Lepelletier has a stationary member in the forward planetary gearset to provide an underdrive input to the ratio gearset, which is preferably a Ravigneaux-type set.

U.S. Pat. No. 6,135,912 issued to Tsukamoto, et al. Oct. 24, 2000, provides solutions for packaging the friction devices within the Lepelletier type of six-speed transmission. However, there are many other six-speed planetary gearsets with five torque-transmitting mechanisms that cannot be accommodated by the Tsukamoto, et al. arrangement.

SUMMARY OF THE INVENTION

It is an object of the present invention to provide an improved power transmission for a vehicle having three planetary gearsets and five torque-transmitting mechanisms that are engageable in combinations of two to establish six forward speed ratios and one reverse speed ratio through the transmission.

In one aspect of the present invention, the transmission incorporates four disc-type torque-transmitting mechanisms and one band-type torque-transmitting mechanism.

In another aspect of the present invention, the transmission includes an input end wall, an output end wall, and a housing interconnecting the end walls and wherein the band torque-transmitting mechanism is positioned substantially adjacent the output end wall.

In yet another aspect of the present invention, the four disc-type torque-transmitting mechanisms are disposed within the housing forward of the band-type torque-transmitting mechanism.

In still another aspect of the present invention, the band-type torque-transmitting mechanism is disposed radially outward of one of the planetary gearsets of the transmission.

In yet still another aspect of the present invention, at least one of the disc-type torque-transmitting mechanisms is disposed between a forward one of the planetary gearsets and the forward end wall.

In a yet still another aspect of the present invention, one of the disc-type torque-transmitting mechanisms is disposed radially outward of one of the planetary gearsets.

In a further aspect of the present invention, two of the disc-type torque-transmitting mechanisms are disposed between a forwardmost of the planetary gearsets and an intermediate positioned planetary gearset.

DESCRIPTION OF THE EXEMPLARY EMBODIMENTS

Figure 1:
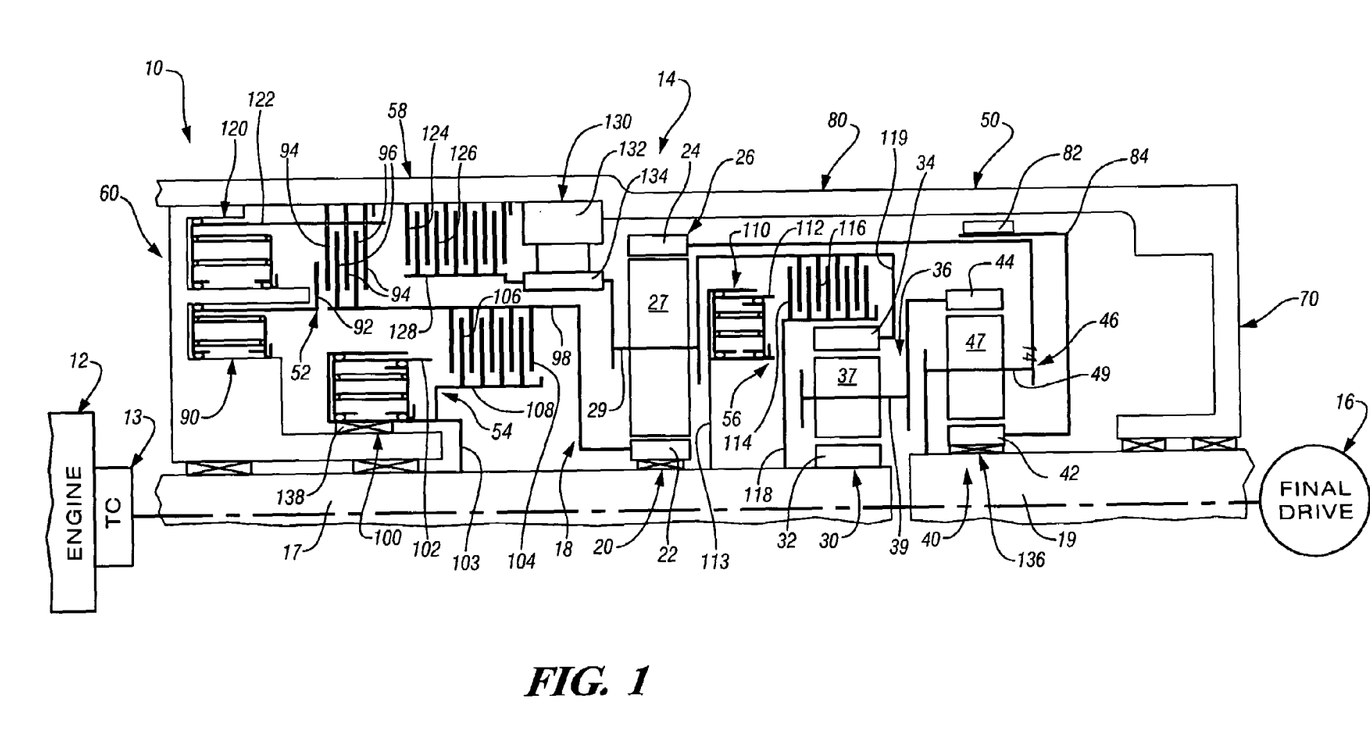
FIG. 1 is a diagrammatic representation of a powertrain having a transmission incorporating the present invention.

Referring to the drawings, wherein like characters represent the same or corresponding parts throughout the several views, there is seen in FIG. 1 a powertrain 10 having a conventional internal combustion engine 12, a conventional torque converter 13, a power transmission 14, and a conventional final drive mechanism 16.

The power transmission 14 includes an input shaft 17, a planetary gear arrangement 18, and an output shaft 19. The planetary gear arrangement 18 includes three planetary gearsets 20, 30, and 40, and five selectively-engageable torque-transmitting mechanisms 50, 52, 54, 56, and 58. The input shaft 17 is drivingly connected with a conventional turbine disposed within the conventional torque converter 13. The output shaft 19 is drivingly connected with the final drive mechanism 16. As is well known in vehicle structures, the final drive mechanism provides output shafts to drive the driven wheels of a vehicle.

The power transmission 14 has an input or forward end wall 60, an output or rear end wall 70, and a housing 80, which interconnects between the end walls 60 and 70 to provide a space in which the planetary gearsets 20, 30, and 40 and the torque-transmitting mechanisms 50, 52, 54, 56, and 58 are located.

The planetary gearset 20 includes a sun gear member 22, a ring gear member 24, and a planet carrier assembly member 26. The planet carrier assembly member 26 includes a plurality of pinion gears 27 rotatably mounted on a planet carrier member 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 rotatably mounted on a planet carrier member 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 rotatably mounted on a planet carrier member 49 and disposed in meshing relationship with both the sun gear member 42 and the ring gear member 44.

The sun gear member 32 is continuously drivingly connected with the input shaft 17 and the ring gear member 24 and planet carrier member 49 are continuously drivingly connected with the output shaft 19.

The torque-transmitting mechanism 50 is a conventional band brake, which includes a band 82 disposed around a hub or drum 84, which is continuously connected with the sun gear member 42. As is well known with band brakes, the mechanism includes the band 82 and a servomechanism, not shown, which includes a hydraulically-operated piston member generally disposed in a cavity formed in either the transmission housing 80 or in a control housing, not shown. The conventional components will be familiar to those skilled in the art and do not need further description for an understanding of the present invention. When the band 82 is engaged on the drum 84 the sun gear member 42 will be held stationary.

The torque-transmitting mechanism 52 includes a servomechanism 90, which has a selectively-operable piston 92 adapted to engage one of a plurality of friction discs 94. The friction discs 94 are disposed to frictionally engage a plurality of friction discs 96 when the torque-transmitting mechanism 52 is engaged. The friction discs 94 are drivingly connected through conventional means, such as a spline to the housing 80, and the friction plates 96 are drivingly connected in a conventional manner with a hub or housing 98, which is continuously drivingly connected with the sun gear member 22. The torque-transmitting mechanism 52 is a disc brake or reaction clutch, which will, when engaged, hold the sun gear member 22 stationary.

The torque-transmitting mechanism 54 includes a servomechanism 100, which includes a selectively-operable piston 102 supported in a housing 103 and adapted to engage one of a plurality of friction plates 104. The housing 103 is drivingly connected with the input shaft 17. The friction plates 104 when engaged by the piston 102 will engage a plurality of friction plates 106 to form a frictional engagement between a hub 108 connected with the input shaft 17 and the hub 98 connected with the sun gear member 22. When the torque-transmitting mechanism 54 is engaged, the input shaft 17 will be drivingly connected with the sun gear member 22.

The torque-transmitting mechanism 56 includes a servomechanism 110 having a selectively-engageable fluid-operated piston 112. The piston 112 is adapted to engage one of a plurality of friction plates 114, which, when engaged, will frictionally engage a plurality of friction plates 116. The friction plates 114 are connected through a hub 118 with the input shaft 17 and the friction plates 116 are connected through a hub 119 with the ring gear member 34 and the planet carrier member 29. When the torque-transmitting mechanism 56 is engaged, the ring gear member 34 and the planet carrier member 29 will be drivingly connected with the input shaft 17.

The torque-transmitting mechanism 58 includes a servomechanism 120 having a selectively-engageable fluid-operated piston 122, which is adapted to engage one of a plurality of friction discs or plates 124. When the friction discs 124 are engaged by the piston 122, they will frictionally engage a plurality of friction discs or plates 126. The piston 122 passes through the splines of the discs 94 to permit engagement with the friction plates 124. This type of piston and friction-type design is well known in the art of power transmissions. The friction plates 124 are drivingly connected with the housing 80 and the friction discs 126 are drivingly connected with a hub 128, which is continuously drivingly connected with the planet carrier member 29 and the ring gear member 34. When the torque-transmitting mechanism 58 is engaged, the planet carrier member 29 and the ring gear member 34 will be held stationary.

From the above description, those skilled in the art will recognize that the torque-transmitting mechanisms 50, 52, and 58 are brake mechanisms and the torque-transmitting mechanisms 54 and 56 are clutch mechanisms. In the engineering field, the disc-type brakes are commonly termed reaction clutches and the conventional clutch mechanisms are referred to as rotary clutches.

Also disposed within the transmission housing 80 is a conventional one-way brake 130, which has an outer race 132 secured to the housing 80 and an inner race 134 secured to the hub 128. The one-way brake 130 will inhibit rotation of the planet carrier member 29 and ring gear member 34 in the reverse direction of operation. However, as is well known, this device will permit free forward rotation of the mechanisms to which it is connected. The use of one-way devices in planetary transmissions is well known.

The power transmission 14 will provide six forward speed ratios and one reverse speed ratio between the engine 12, the torque converter 13, and the final drive mechanism 16.

The reverse speed ratio is established with the engagement of the torque-transmitting mechanisms 54 and 58. The first forward speed ratio is established with the engagement of the torque-transmitting mechanisms 50 and 58. The second forward speed ratio is established with the engagement of the torque-transmitting mechanisms 50 and 52. The third forward speed ratio is established with the engagement of the torque-transmitting mechanisms 50 and 54. The fourth forward speed ratio is established with the engagement of the torque-transmitting mechanisms 50 and 56. The fifth forward speed ratio is established with the engagement of the torque-transmitting mechanisms 54 and 56. The sixth forward speed ratio is established with the engagement of the torque-transmitting mechanisms 52 and 56.

From the above-described combinations of engagement, it is apparent that the torque-transmitting mechanisms 52 and 54 are never engaged at the same time and the torque-transmitting mechanisms 56 and 58 are not engaged at the same time.

The band 82 of the torque-transmitting mechanism 50 is disposed radially outward of the planetary gearset 40, such that it is substantially supported in a radial direction when engaged by a bearing 136.

The torque-transmitting mechanisms 52, 54, and 58 are disposed between the forward end wall 60 and the planetary gearset 20. The torque-transmitting mechanisms 52 and 58 have their respective servomechanisms 90 and 120 disposed within the end wall 60. The torque-transmitting mechanism 54 has the servomechanism 100 thereof disposed on a bearing 138, which is supported on the end wall 60. The torque-transmitting mechanism 56 has the friction plates 114 and 116 thereof disposed radially outward of the planetary gearset 30 and the servomechanism 110 thereof disposed intermediate the planetary gearsets 20 and 30. This makes for a fairly compact longitudinal power transmission.

Figure 2:
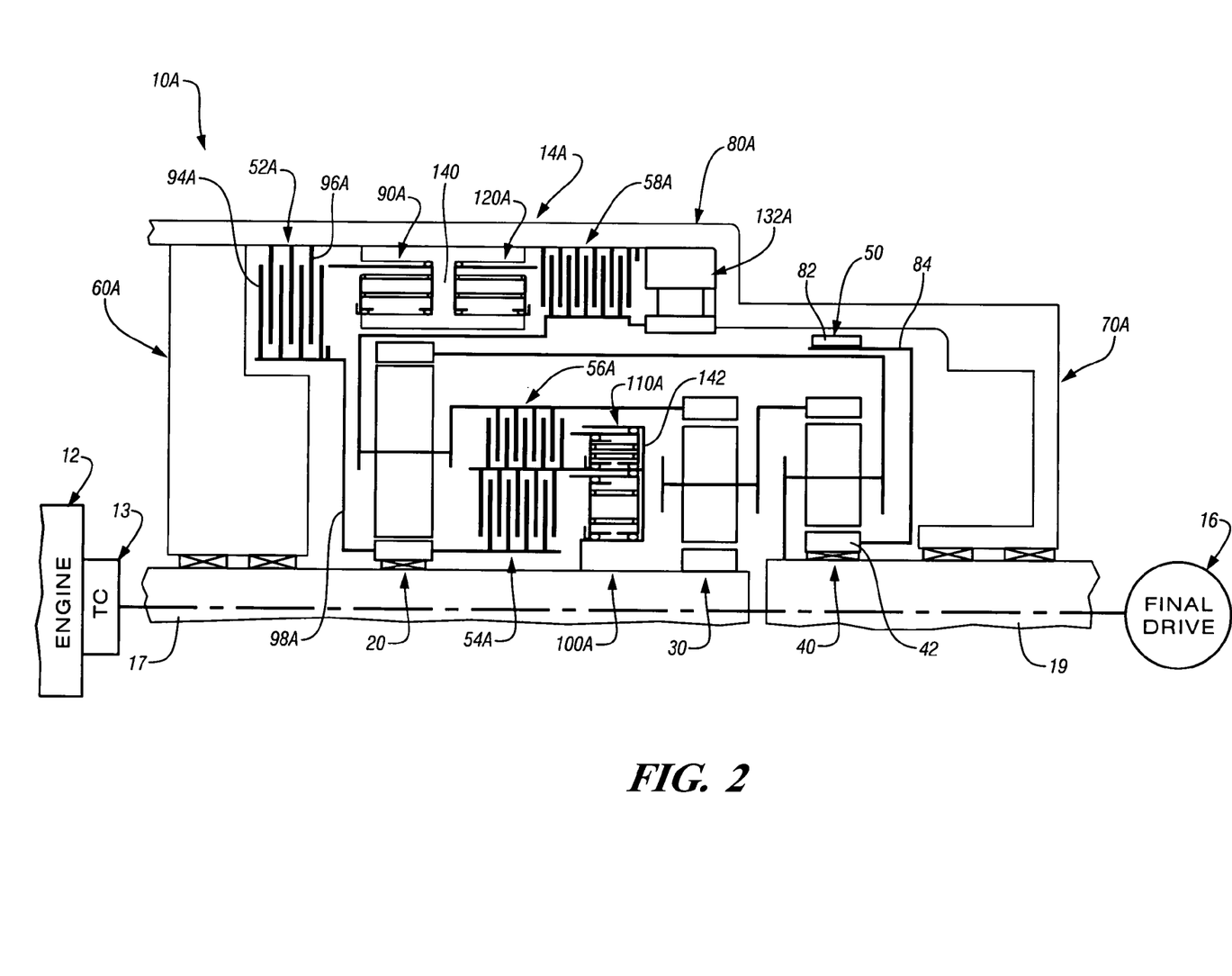
FIG. 2 is a diagrammatic representation of a powertrain incorporating another embodiment of the present invention.

A powertrain 10A is shown in FIG. 2. The corresponding components have been given the same numerical designation and the similar components have been given the same numerical designation with an "A" suffix.

In FIG. 2, it can be seen that the torque-transmitting mechanism 50 has the band member 82 thereof encircling the hub 84, which is connected with the sun gear member 42. The torque-transmitting mechanism 52A has the servomechanism 90A thereof disposed in a housing 140, which is secured to the housing 80A. The torque-transmitting mechanism 54A has the servomechanism 100A thereof disposed in a housing 142, which is drivingly connected with the input shaft 17. The torque-transmitting mechanism 56A has the servomechanism 110A thereof also disposed in the housing 142. The torque-transmitting mechanism 58A has the servomechanism 120A thereof disposed in the housing 140.

As with the powertrain shown in FIG. 1, the torque-transmitting mechanism 50 is surrounding the planetary gearset 40. The torque-transmitting mechanism 52A has the friction plates 94A and 96A thereof disposed between the planetary gearset 20 and the forward end wall 60A and the servomechanism 90A thereof disposed radially outward of the planetary gearset 20. The torque-transmitting mechanism 54A and 56A have the servomechanisms 100A and 100A, respectively, disposed between the planetary gearsets 20 and 30. The torque-transmitting mechanism 58A is disposed radially outward of the space between the planetary gearsets 20 and 30. This is a further embodiment of the present invention, which provides a compact longitudinal power transmission.

Figure 3:
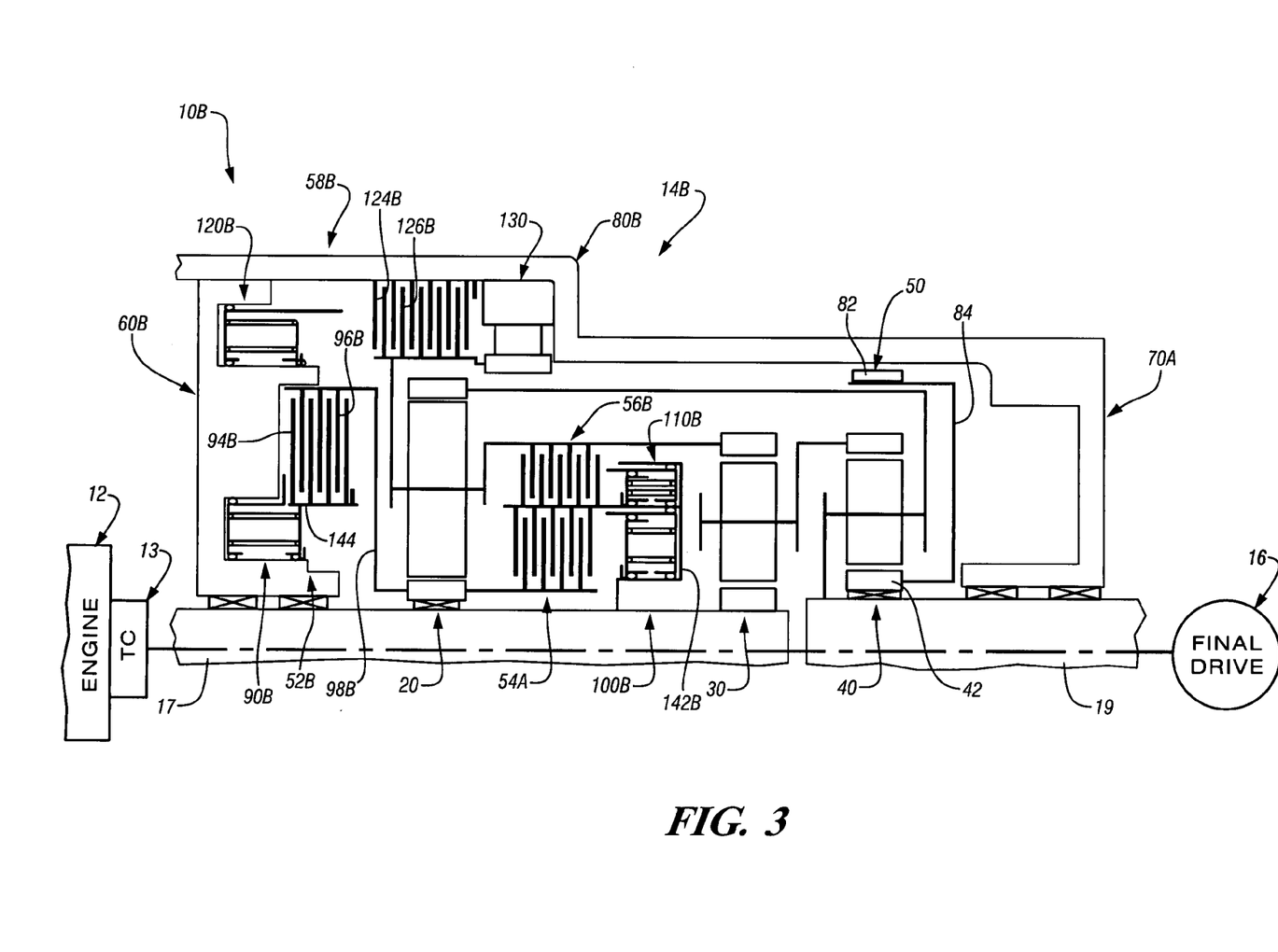
FIG. 3 is a diagrammatic representation of a powertrain incorporating a third embodiment of the present invention.

A powertrain 10B, shown in FIG. 3, incorporates the power transmission 14B, which includes the planetary gearsets 20, 30, and 40 and the torque-transmitting mechanisms 50, 52B, 54B, 56B, and 58B. The torque-transmitting mechanisms that are similar to those shown in FIG. 1 have the same numerical designation with a "B" suffix. Those torque-transmitting mechanisms that are identical with FIG. 1 have the same numerical designation.

The torque-transmitting mechanism 50 has the band 82 thereof encircling the planetary gearset 40 and the drum 84, which is connected with the sun gear member 42. The torque-transmitting mechanism 52B has the servomechanism 90B thereof disposed within the end wall 60B. The friction plates 94B are splined to a housing 144, which in turn is grounded to the end wall 60B. The friction plates 96B are splined to the housing 98B, which in turn is continuously connected with the sun gear member 22. The torque-transmitting mechanism 54B and torque-transmitting mechanism 56B are similar to torque-transmitting mechanisms 54A and 56A shown in FIG. 2. The torque-transmitting mechanism 58B has the servomechanism 120B thereof disposed within the end wall 60B in a manner similar to that shown in FIG. 1. The friction plates 124B and 126B of the torque-transmitting mechanism 58B are disposed radially outward of the planetary gearset 20. The power transmission 14B provides the same six forward speed ratios and one reverse speed ratio as the power transmissions 14 and 14A.

Figure 4:
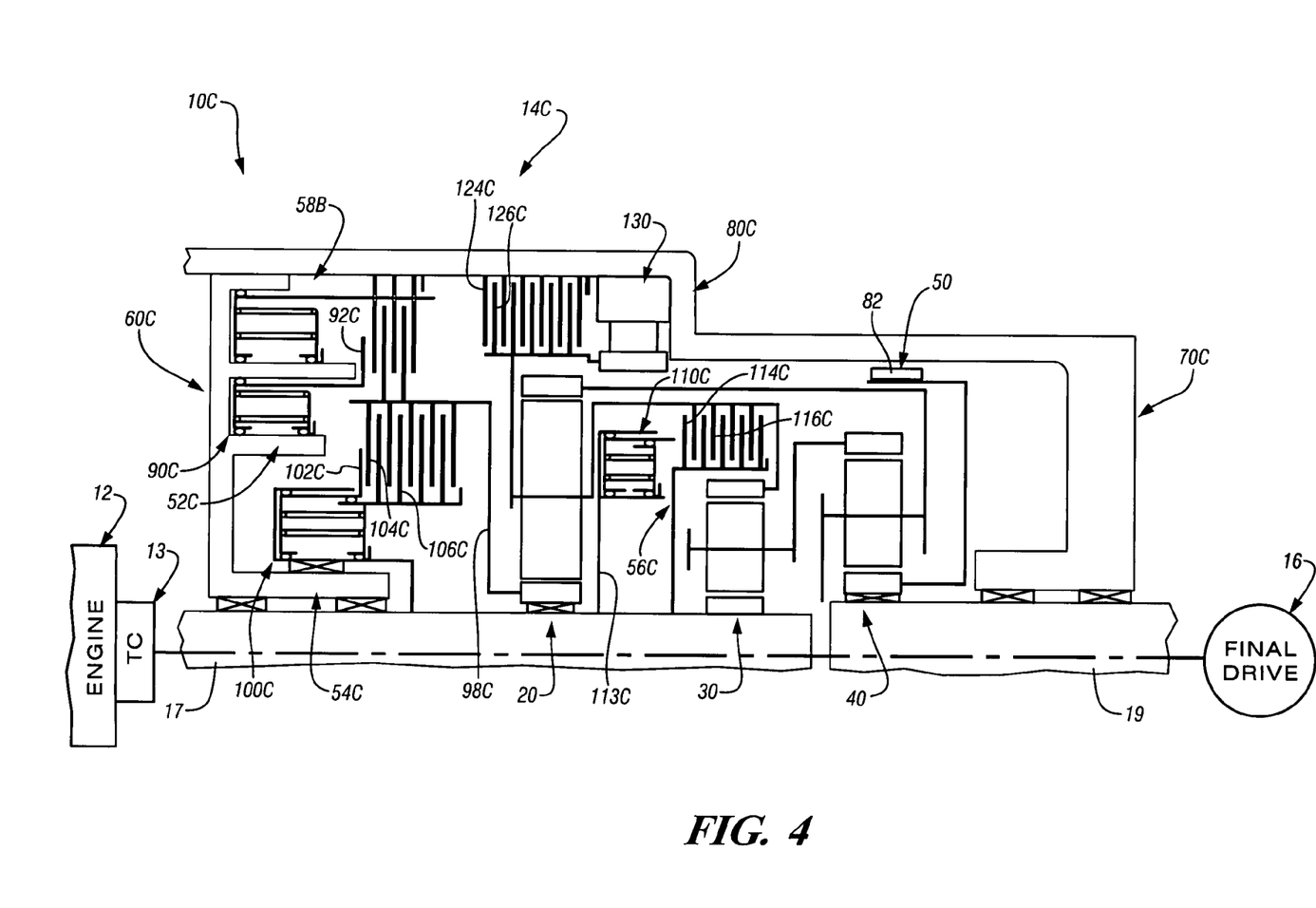
FIG. 4 is a diagrammatic representation of a powertrain incorporating a fourth embodiment of the present invention.

A powertrain 10C is shown in FIG. 4. The corresponding components have been given the same numerical designation and similar components have been given the same numerical designation with a "C" suffix.

In FIG. 4, the torque-transmitting mechanism 54C has the servomechanism 100C disposed in the housing 103C, which is rotatably supported on the bearing 138 and drivingly connected with the input shaft 17. The torque-transmitting mechanism 56C has the servomechanism 110C thereof disposed in the housing 113C drivingly connected with the input shaft 17 and the friction plates 114C and 116C thereof disposed radially outward of the planetary gearset 30. The torque-transmitting mechanism 58C is disposed in a manner similar to torque-transmitting mechanism 58, shown in FIG. 1. Note that the torque-transmitting mechanisms 52C, 54C, and 58C are similar to their counterparts 52, 54, and 58, which are shown in FIG. 1, and the torque-transmitting mechanism 56C is similar in construction.

In the power transmission 14C shown in FIG. 4, the friction plates 94C, 96C, and 104C, 106C of the torque-transmitting mechanisms 52C and 54C are disposed in radial alignment, while the friction plates 124C, 126C of the torque-transmitting mechanism 58C are axially offset. The torque-transmitting mechanism 50 is disposed radially outward of the planetary gearset 40 in a manner similar to that shown in FIGS. 1 and 2. The five torque-transmitting mechanisms 50, 52C, 54C, 56C, and 58C are engaged in the same sequence as described in FIG. 1 to provide the six forward speed ratios and one reverse speed ratio between the input shaft 17 and the output shaft 19.

Figure 5:
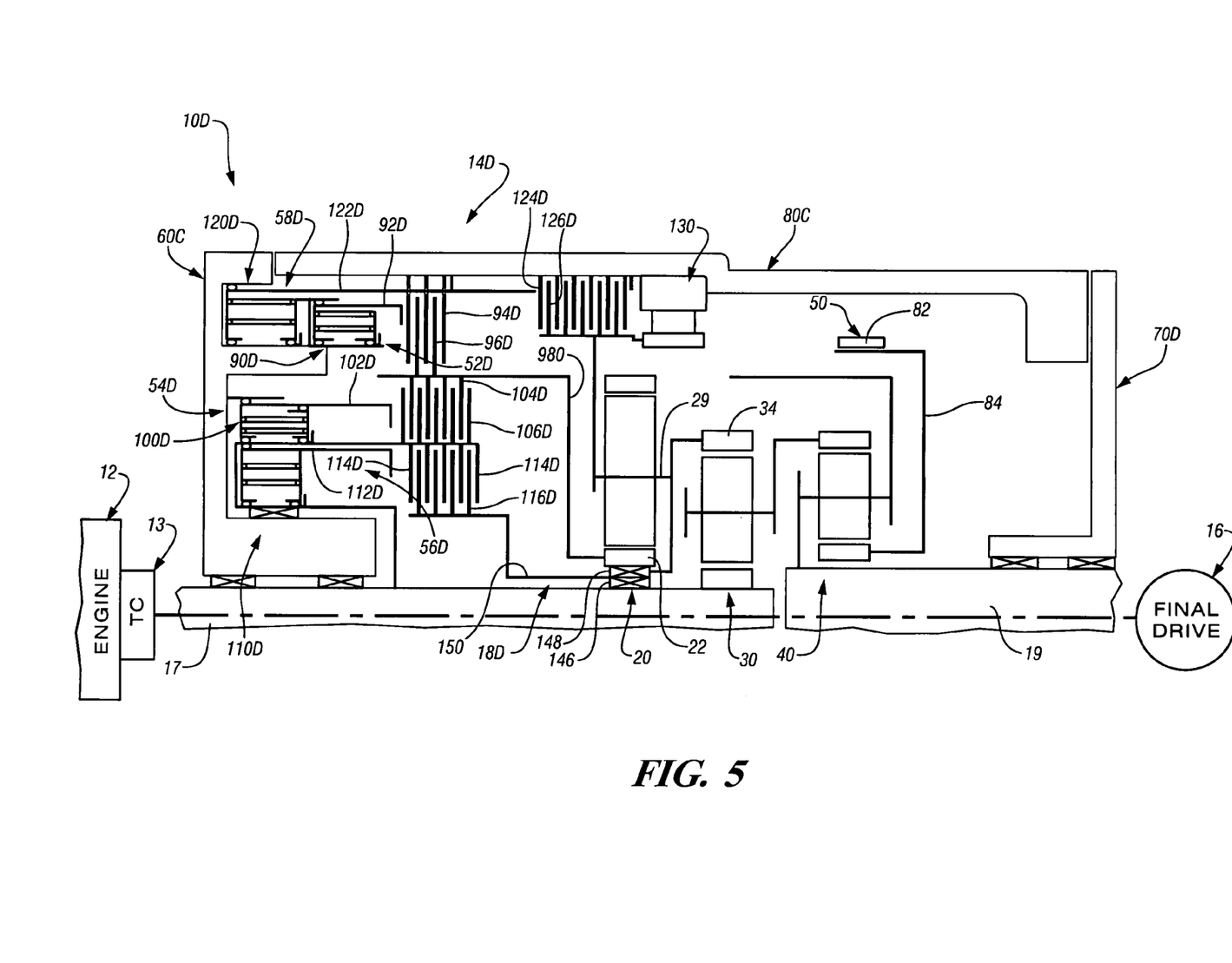
FIG. 5 is a diagrammatic representation of a powertrain incorporating a fifth embodiment of the present invention.

The powertrain 10D shown in FIG. 5 includes the planetary gearsets 20, 30, and 40 and the torque-transmitting mechanisms 50, 52D, 54D, 56D, and 58D. The torque-transmitting mechanism 50 has the brake band 82 disposed to engage the drum 84, which surrounds a portion of the planetary gearset 40 in a manner similar to that described and shown in FIGS. 1 through 4. The torque-transmitting mechanisms 52D and 58D are supported in the end wall 60D and have their respective servomechanisms 90D and 120D axially aligned and supported in the end wall 60D. The torque-transmitting mechanisms 54D and 56D have the servomechanisms 100D and 110D thereof radially stacked on the end wall 60D and supported rotatably by a bearing 146.

The power transmission 14D shown in FIG. 5 provides another compact longitudinal transmission package wherein all of the servomechanisms are disposed forward of the planetary gearsets and the torque-transmitting mechanism 50 is disposed radially outward of the planetary gearset 40. The friction discs 94D and 96D of torque-transmitting mechanism 52D, the friction plates 104D and 106D of torque-transmitting mechanism 54D, and the friction plates 114D and 116D of the torque-transmitting mechanism 56D are arranged radially, and the friction plates 124D and 126D of the torque-transmitting mechanism 58D are aligned axially with the friction plates of the torque-transmitting mechanism 52D. This provides a compact longitudinal transmission wherein four of the torque-transmitting mechanisms 52D, 54D, 56D, and 58D are disposed essentially forward of the planetary gearsets and wherein the three planetary gearsets are combined within a compact package in the center of the power transmission.

One feature shown in FIG. 5 that is not shown in the other embodiments of this invention is the radially stacking of bearings 146 and 148, which rotatably support the sun gear member 22 and also rotatably support a hub 150, which interconnects the torque-transmitting mechanism 56D with the ring gear member 34 and the planet carrier member 29.

Figure 6:
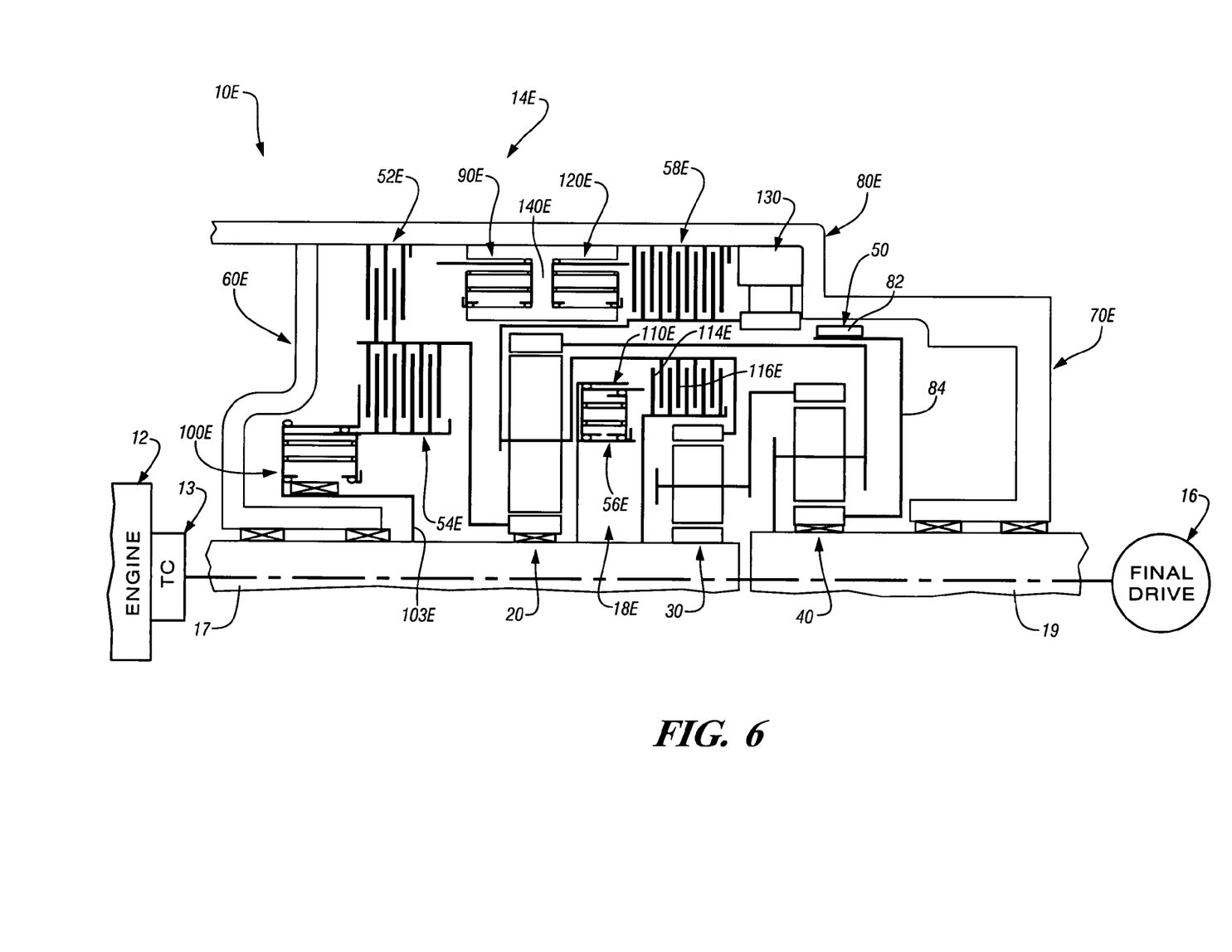
FIG. 6 is a diagrammatic representation of a powertrain incorporating a sixth embodiment of the present invention.

A powertrain 10E shown in FIG. 6 includes the power transmission 14E, which includes the planetary gear arrangement 18E. The planetary gear arrangement includes planetary gearsets 20, 30, and 40, and the torque-transmitting mechanisms 50, 52E, 54E, 56E, and 58E. The torque-transmitting mechanism 50 includes the band 82, which surrounds the hub 84 substantially radially outward of the planetary gearset 40. The torque-transmitting mechanism 52E has the servomechanism 90E thereof disposed in a housing 140E similar to that shown in FIG. 2. The torque-transmitting mechanism 54E has the servomechanism 100E thereof disposed in the housing 103E drivingly connected with the input shaft 17 in a manner similar to that shown in FIGS. 1 and 4. The torque-transmitting mechanism 56E has the servomechanism 110E disposed between the planetary gearsets 20 and 30 in a manner similar to that shown in FIGS. 1 and 4, and the friction plates 114E and 116E thereof disposed radially outward of the planetary gearset 30. The torque-transmitting mechanism 58E has the servomechanism 120E thereof disposed within the housing 140E in a manner similar to that shown in FIG. 2.

The torque-transmitting mechanisms 50, 52E, 54E, 56E, and 58E are engaged in combinations of two in a manner similar to that described above for FIG. 1 to provide six forward speed ratios and one reverse speed ratio between the input shaft 17 and the output shaft 19. This arrangement provides for a compact longitudinal power transmission wherein two of the disc-type torque-transmitting mechanisms are stacked radially between the front end cover 60E and the planetary gearset 20; two of the torque-transmitting mechanisms are stacked radially outboard of the planetary gearset 30; and one of the torque-transmitting mechanisms in the band brake type torque-transmitting mechanism is disposed radially outward of the planetary gearset 40.

Each of the above-described power transmissions includes the band brake or torque-transmitting mechanism 50, which is disposed radially outward of the rearmost planetary gearset; namely, planetary gearset 40. The remaining torque-transmitting mechanisms are disposed within the housing 80 to provide either a compact longitudinal package or a compact radial package.

What is claimed is:

1. A power transmission comprising:
 a transmission housing including a stationary front end wall rotatably supporting an input shaft, a stationary rear end wall rotatably supporting an output shaft, and a stationary housing portion interconnecting said front end wall and said rear end wall;
 a forward planetary gearset, a central planetary gearset, and a rearward planetary gearset disposed within said housing and axially aligned between said front and rear end walls, said forward planetary gearset having a planet carrier member continuously connected with a ring gear member of said central planetary gearset and a ring gear member continuously connected with a planet carrier member of said rearward planetary gearset and said output shaft, said central planetary gearset having a planet carrier continuously connected with a ring gear member of said rearward planetary gearset and a sun gear member continuously connected with said input shaft;
 five torque-transmitting mechanisms disposed within said housing portion intermediate said front end wall and said rear end wall including a first torque-transmitting mechanism having a band member radially surrounding a hub at least a portion of which radially surrounds said rearward planetary gearsets adjacent said rear end wall;
 four of said torque-transmitting mechanisms having friction disc structures disposed between said from end wall and said rearmost planetary gearset; with either
 three of said four torque-transmitting mechanisms having friction discs positioned between said front end wall and said forward planetary gearset and at least two of said torque-transmitting mechanisms having servo mechanisms having non-rotatable engagement pistons supported in said front end wall, and the fourth of said torque-transmitting mechanisms having friction discs disposed between said forward planetary gearset and said central planetary gearset or,
 two of said torque-transmitting mechanisms having friction discs each have a servomechanism having a non-rotatable engagement piston supported in said housing portion or said front end wall, and two of said torque-transmitting mechanisms having friction discs have servomechanisms supported in a hub connected with said input shaft and positioned axially between said forward and central planetary gearsets or,
 two of said torque-transmitting mechanisms have servomechanisms having non-rotatable engagement pistons supported in said front end wall or,
 three of said torque-transmitting mechanisms having friction discs have servomechanisms having non-rotatable engagement pistons supported in said front end wall or,
 four of said torque-transmitting mechanisms having friction discs have two servomechanisms having non-rotatable engagement pistons supported on said front end wall and two servo mechanisms supported in said front end wall or
 two of said torque-transmitting mechanisms having friction discs being stationary torque-transmitting mechanisms having servomechanisms having non-rotatable engagement pistons supported in said housing portion substantially radially outboard of said forward planetary gearset, another of said torque-transmitting mechanisms having friction discs being a clutch having a servomechanism rotatably supported on said front end wall, and a further of said torque-transmitting mechanisms having friction discs being a clutch having a servomechanism supported in a hub between said forward planetary gearset and said central planetary gearset; and
 said five torque-transmitting mechanisms being engaged in combinations of two to establish six forward speed ratios and one reverse speed ratio between said input shaft and said output shaft through said planetary gearsets.

* * * * *